(12) United States Patent
Yeh et al.

(10) Patent No.: US 8,338,984 B2
(45) Date of Patent: Dec. 25, 2012

(54) UNINTERRUPTIBLE POWER SUPPLY SUPPORTING ACTIVE LOADS

(75) Inventors: Shou-Ting Yeh, Taipei (TW); Yung-Mei Lin, Taipei (TW); Hung-Ming Hsieh, Taipei (TW)

(73) Assignee: Cyber Power System Inc., Nankang Dist., Taipei (TW)

( * ) Notice: Subject to any disclaimer, the term of this patent is extended or adjusted under 35 U.S.C. 154(b) by 409 days.

(21) Appl. No.: 12/589,379

(22) Filed: Oct. 22, 2009

(65) Prior Publication Data
US 2011/0095611 A1 Apr. 28, 2011

(51) Int. Cl.
*H02J 9/00* (2006.01)
(52) U.S. Cl. ........................................................ 307/64
(58) Field of Classification Search .................... 307/65, 307/64
See application file for complete search history.

(56) References Cited

U.S. PATENT DOCUMENTS

| 6,479,970 B2* | 11/2002 | Reddy | 320/162 |
| 7,157,886 B2* | 1/2007 | Agarwal et al. | 323/207 |

* cited by examiner

Primary Examiner — Michael Rutland Wallis
(74) Attorney, Agent, or Firm — Charles E. Baxley (57) ABSTRACT

An uninterruptible power supply supporting active loads includes a charge and discharge module having a battery set and a charger charging the battery set with an input power, a switch circuit having at least two active switches connected to the battery set, a dynamic PWM control module connected with each of the active switches of the switch circuit, alternately outputting duty cycles composed of low-frequency square wave and high-frequency square wave and alternately controlling each of the active switches to turn on or off, and a transformer having a primary side connected with the switch circuit and a secondary side whose two terminals are connected with an output capacitor generating a filtering function in collaboration with an leakage inductor in the secondary side of the transformer. The uninterruptible power supply generates a quasi-continuous output satisfying the hold-up time demanded by an active load.

8 Claims, 12 Drawing Sheets

UNINTERRUPTIBLE POWER SUPPLY SUPPORTING ACTIVE LOADS

BACKGROUND OF THE INVENTION

1. Field of the Invention

The present invention is related to an uninterruptible power supply (UPS) supporting active loads, and more particularly to a UPS satisfying the hold-up time demanded by active loads.

2. Description of the Related Art

CBEMA (Computer and Business Equipment Association) stipulates that computers and commercial equipment shall be able to withstand power outage or signal transition time for at least 8 milliseconds so that the computers and commercial equipment can sustain basic working power for a while during the course of power outage or signal transition. Usually, computers and commercial equipment are all equipped with power supplies to support their operating power. Hence, the power supplies of computers and commercial equipment shall be able to sustain the operating power thereof for 8 milliseconds after a power failure, so as to smoothly complete the power-off procedure.

Figure 8:
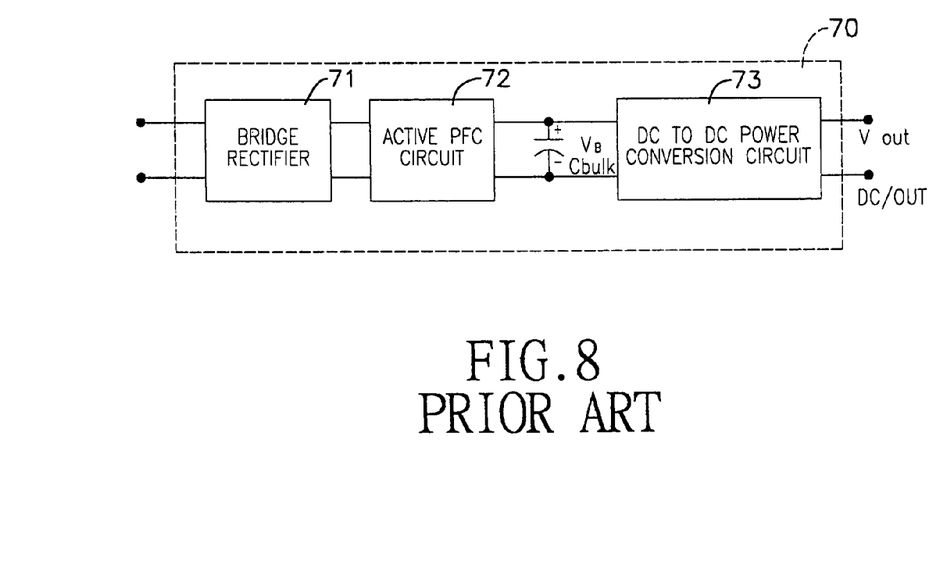
FIG. 8 is a block diagram of a conventional active power supply device.

With reference to FIG. 8, an active power supply (70) having a time-sustaining function includes a bridge rectifier (71), an active power factor correction (PFC) circuit (72), an output capacitor $C_{bulk}$ and a DC to DC converter (73).

An input terminal of the bridge rectifier (71) is connected to an AC mains to convert the AC power into a DC power. The active PFC circuit (72) has an input terminal and an output terminal. The input terminal of the active PFC circuit (72) is connected with an output terminal of the bridge rectifier (71) to perform power factor correction of the DC power outputted from the bridge rectifier (71) so as to make the phases of the voltage and current of the AC MAINS consistent. The output capacitor $C_{bulk}$ is connected to an output terminal of the active PFC circuit (72). The DC to DC converter (73) has an input terminal and an output terminal, and the input terminal is connected with the $C_{bulk}$ to acquire the DC power and output the DC power after converting it into a low voltage of DC power.

Figures 9A, 9B:
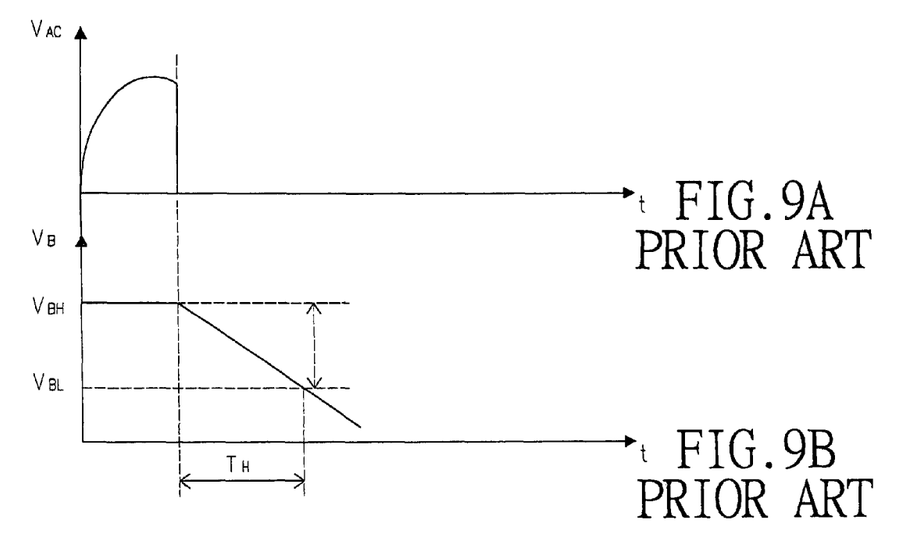
FIGS. 9A and 9B are waveform diagrams showing output voltages of the AC mains and the active power supply device.

The so-called active power supply (70) has its name simply after the adopted active PFC circuit (72). The active PFC circuit (72) has a time-sustaining circuit (not shown). With reference to FIG. 9A, which illustrates the function of the time-sustaining circuit, the vertical axis $V_{AC}$ vs. the horizontal time axis shows the waveform of the power of the AC mains to the input terminal of the active power supply (70). When $V_{AC}$ is cut off, the time-sustaining circuit supplies the DC power stored therein to the output capacitor $C_{bulk}$ to delay the time that the voltage of the DC power $V_{BH}$ of the output capacitor $C_{bulk}$ drops to a low voltage threshold value $V_{BL}$. With reference to FIG. 9B, the vertical axis $V_{AC}$ vs. the horizontal time axis B shows the hold-up time $T_H$, which is the time that the maximum voltage $V_{BH}$ of the output capacitor $C_{bulk}$ drops to the low voltage threshold value $V_{BL}$.

Figure 10:
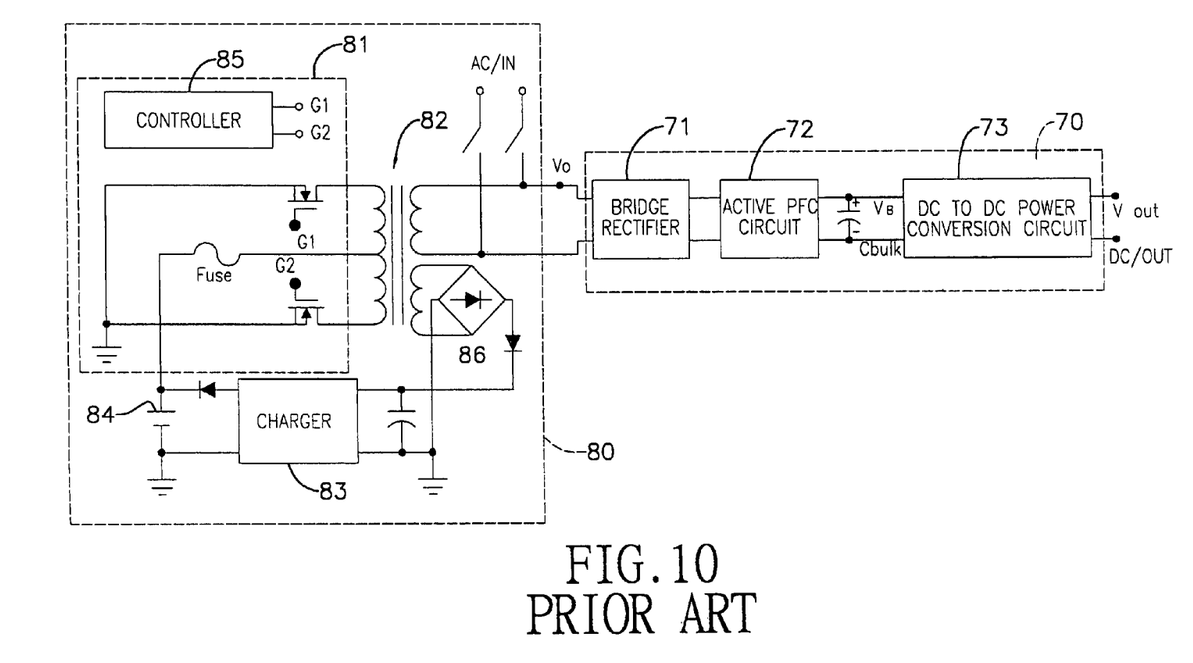
FIG. 10 is a circuit diagram of a conventional UPS and the active power supply device.

To keep computers and commercial equipment constantly running under a power outage of the AC mains, UPSs are supplemented for that role. In other words, UPSs are connected between the AC mains and power supplies of computers and commercial equipment. When the AC mains normally supplies power, the UPSs store power. When the AC mains is out, the power stored in the UPSs is converted into an AC power to continuously supply power to the computers and the commercial equipment. Hence, from the point of the power supplies, the AC power of the input terminal is always on so as to keep supplying power to the computers and commercial equipment. However, current UPSs fail to support all types of power supply devices, especially active power supply devices. The reason is explained as follows:

With reference to FIG. 10, a UPS (80) whose output terminal is connected with an input terminal of an active power supply (70), has a transformer (82), a switch circuit (81), a controller (85), a charger (83) and a battery set (84). The transformer has a primary side and a secondary side, in which the secondary side is coupled to an AC mains (AC/IN). The switch circuit (81) is a push-pull converter having two active switches G1 and G2 respectively connected with two windings of the primary side of the transformer (82). The controller (85) is connected to the two active switches G1 and G2 to switch them on or off. The charger (83) is connected to the secondary side of the transformer (82) through a rectification and filter circuit (86) to acquire a charging power. The battery set (84) is connected with an output terminal of the charger (83) and the switch circuit (81) to facilitate charging the battery set (84) through the charger (83). When the AC mains is out, the DC power of the battery set (84) supplies an square-wave AC power to the active power supply device (70) through the switching of the switch circuit (81).

Figure 11A:
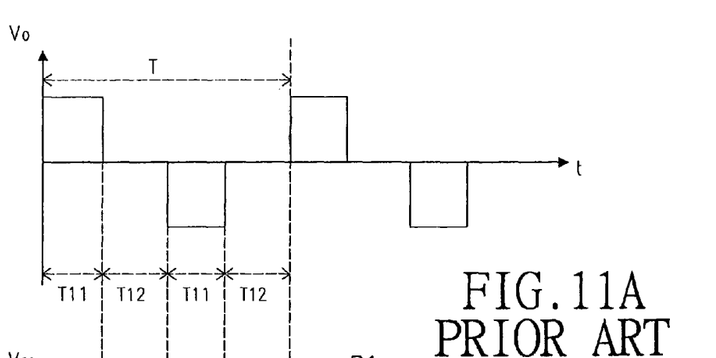
FIGS. 11A, 11B and 11C are waveform diagrams showing voltages of the conventional active power supply device.
Figure 11B:
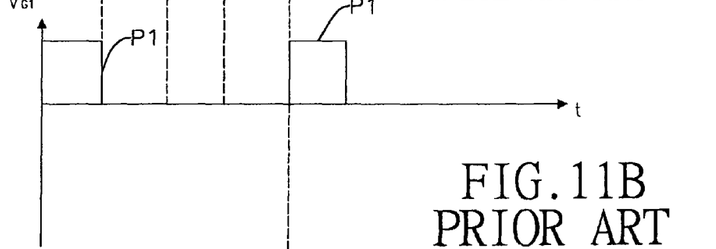
Figure 11C:
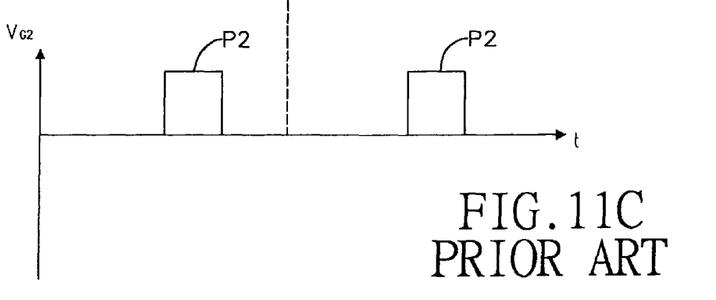
Figures 12A, 12B, 12C, 12D:
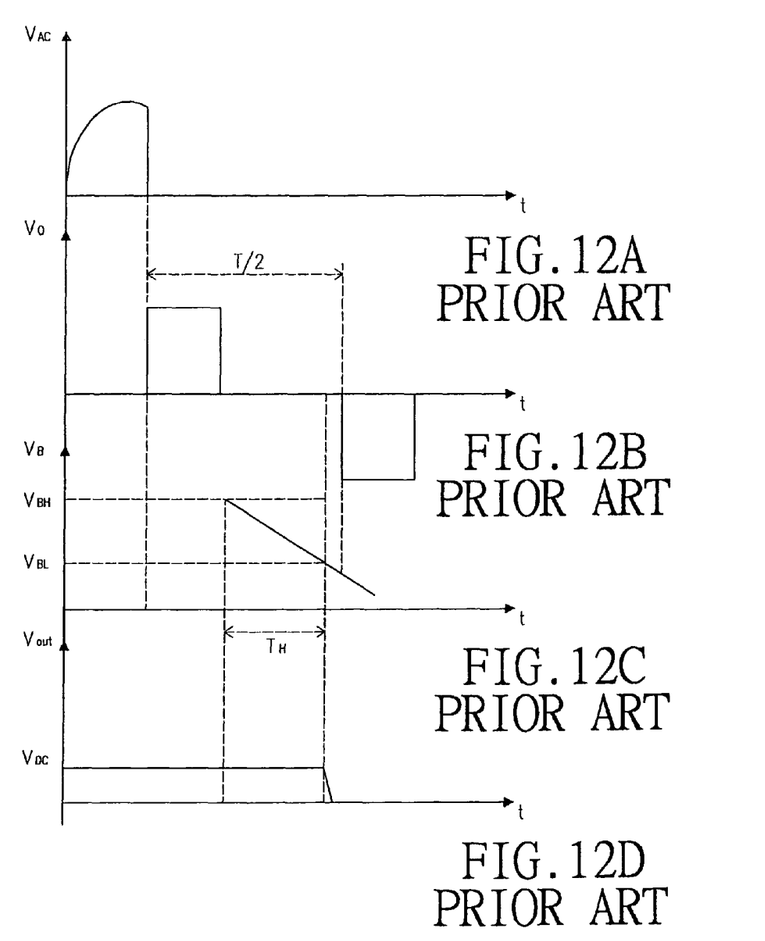
FIGS. 12A, 12B, 12C and 12D are waveform diagrams showing voltages of the conventional UPS and active power supply device.

When the AC mains normally supplies power, the UPS (80) is operated at line mode to let the AC mains directly supply power to the active power supply device (70). On the other hand, when the AC mains is out, the switch circuit (81) of the UPS (80) converts the DC power of the battery set (84) into an square-wave AC power to output through the transformer (82). With reference to FIGS. 11B and 11C for the generation method of the AC power signal in the form of square waves, the controller is instructed to alternately output two pulse width modulation (PWM) signals $V_{G1}$, $V_{G2}$ to two active switches G1 and G2, alternately switching the two active switches G1 and G2 on and off and outputting a square-wave AC power $V_O$ (as shown in FIG. 11A) induced and charged by the secondary side of the transformer. Whereas, if the square-wave AC power $V_O$ outputs to the active power supply device (70) and it is uncertain that the active power supply device (70) can still normally supply working power, the reason behind may be:

after the AC mains is out, the UPS enters the battery mode to output the square-wave AC power (as shown in FIG. 12A); when an off-time T/2 of two adjacent positive and negative square waves in a cycle T of the square-wave AC power $V_O$ (as shown in FIG. 12B) is greater than the hold-up time $T_H$ of the active power supply device (70), under such circumstance (as shown in FIG. 12C), the voltage of the output capacitor $C_{bulk}$ of the active power supply device (70) has dropped below the low voltage threshold value $V_{BL}$ and can no longer output the working power (as shown in FIG. 12D). Therefore, the UPS (80) fails to meet the hold-up time demanded by the active power supply device (70) and thus is not feasible to support the operation of the active power supply device (70).

SUMMARY OF THE INVENTION

An objective of the present invention is to provide an interruptible power supply supporting active loads, so as to meet the hold-up time demanded by pulse signals outputted to an active load and make the active load normally operate.

To achieve the foregoing objective, the uninterruptible power supply supporting active loads has a charge and discharge module, a switch circuit, a dynamic PWM control module and a transformer.

The charge and discharge module has a battery set and a charger charging the battery set with an input power.

The switch circuit has at least two active switches respectively connected to the battery set.

The dynamic PWM control module is connected with each of the active switches of the switch circuit, alternately outputs duty cycles composed of low-frequency square wave and high-frequency square wave, and alternately controls each of the active switches to turn on or off.

The transformer has a primary side and a secondary side. The primary side is connected with the switch circuit and the secondary side has two terminals connected with an output capacitor that generates a filtering function in collaboration with a leakage inductor in the secondary side of the transformer.

The dynamic PWM control module adopted in the UPS can alternately generates various sets of dynamic PWM signals. Given the filtering effect provided by the leakage inductor in the transformer and the output capacitor, a trapezoidal continuous wave can be generated at the power output terminal to satisfy the hold-up time demand in support of an active load. Moreover, the active switches in the UPS perform low-frequency switching most of the time, thereby greatly reducing the switching loss of the active switches (MOSFET). The transformer can adopt a low-frequency transformer with minor modification. As a result, the development cost can be effectively lowered.

DETAILED DESCRIPTION OF THE INVENTION

Figure 1:
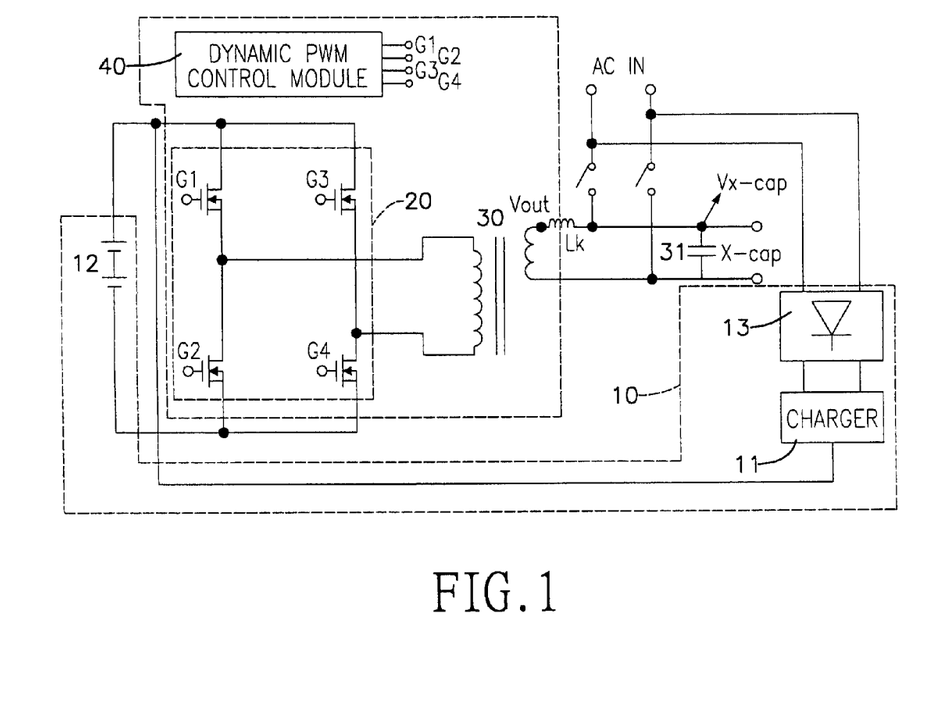
FIG. 1 is a circuit diagram of a preferred embodiment in accordance with the present invention.

With reference to FIG. 1, a preferred embodiment of a UPS supporting active loads in accordance with the present invention has a charge and discharge module (10), a switch circuit (20), a transformer (30) and a dynamic PWM control module (40).

Figure 2:
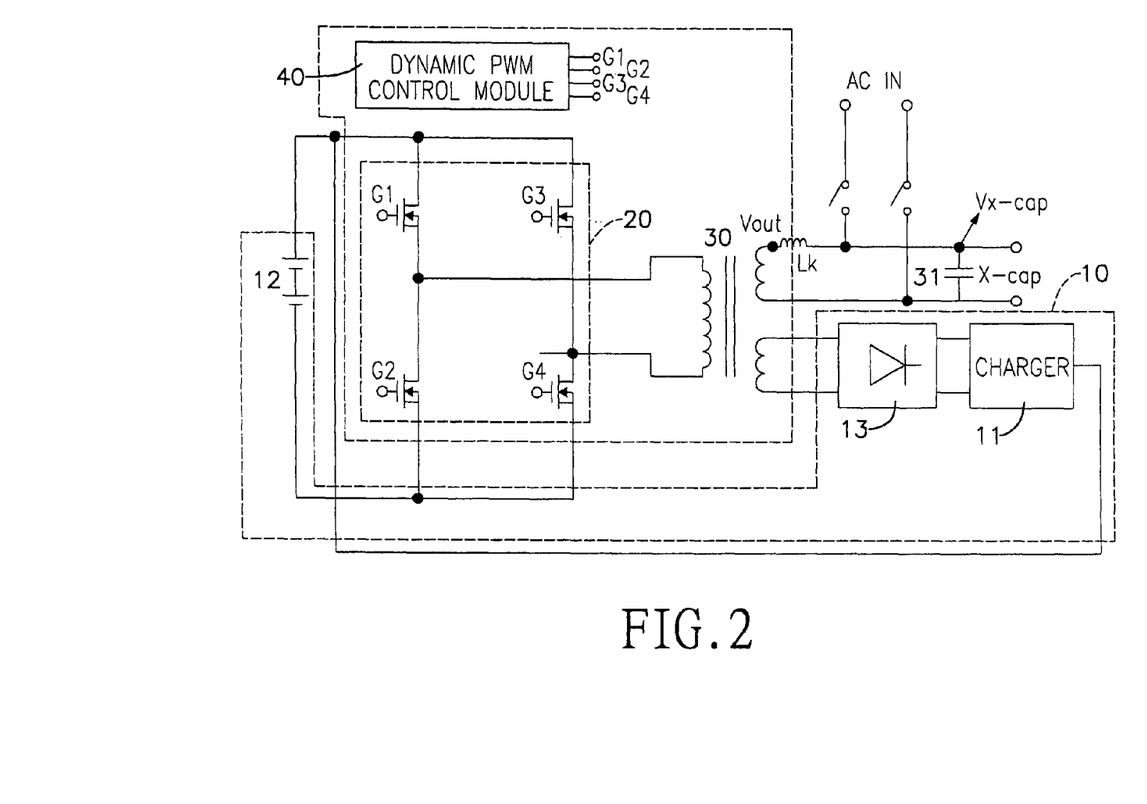
FIG. 2 is a circuit diagram of another preferred embodiment in accordance with the present invention.

The charge and discharge module (10) has a charger (11) and a battery set (12). In the present embodiment, an input terminal of the charger (11) is connected with an AC power (AC IN) through a rectifier (13) to acquire a rectified input power. In addition to acquiring the input power to the charger (11) as the foregoing method, with reference to FIG. 2, the input power to the charger (11) can be also induced and acquired from the other winding of the secondary side of the transformer (30).

With further reference to FIG. 1, in the present embodiment, the switch circuit (20) has four active switches G1, G2, G3 and G4 alternately controlled by the dynamic PWM control module (40) to form a full-bridge conversion circuit. It is optional that the switch circuit (20) can also have two active switches alternately switching to form a half-bridge conversion circuit. The four active switches G1, G2, G3 and G4 are respectively connected with the primary side of the transformer (30) and the battery set (12) to form a power loop. Moreover, the four active switches G1, G2, G3 and G4 are formed by MOSFETs.

An output capacitor (31) is connected in parallel with two terminals of the secondary side of the transformer (30) to form a power output terminal. A leakage inductance is present in the secondary side of the transformer (30) to generate a filtering function in collaboration with the output capacitor (31).

Figure 3:
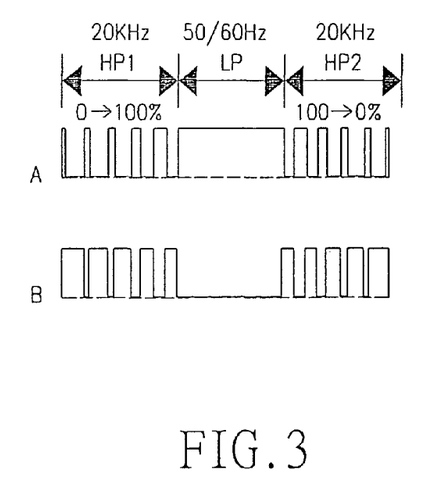
FIGS. 3A and 3B are schematic views showing a duty cycle outputted by a dynamic PWM control module of the present invention.

The dynamic PWM control module (40) is a PWM controller. In the present embodiment, it has four dynamic PWM signal output terminals respectively connected to the gates of the four active switches G1, G2, G3 and G4 in the switch circuit (20) so as to control the duty ratio. With reference to FIG. 3A, the dynamic PWM control module (40) differs from regular PWM controllers in that each duty cycle contains a plurality of low-frequency square waves and high-frequency square waves distributed in a first high-frequency zone (HP1), a low-frequency zone (LP) and a second high-frequency zone (HP2). In the present embodiment, the frequency of the square waves in the two high-frequency zones (HP1, HP2) is 20 kHz, and the frequency of the square waves in the low-frequency zone is 50 Hz or 60 Hz. The widths of the plurality of square waves in the first high-frequency zone prior to the low-frequency zone (LP) increase progressively (0→100%) while the widths of the plurality of square waves in the second high-frequency zone behind the low-frequency zone (LP) decrease progressively (100%→0). Besides, each duty cycle can also be shown as in FIG. 3B and still contains a first high-frequency zone (HP1), a low-frequency zone (LP) and a high-frequency zone (HP2). However, the widths of the plurality of square waves in the first high-frequency zone decrease progressively (100%→0) while the widths of the plurality of square waves in the second high-frequency zone increase progressively (0→100%). The pulse distribution in FIG. 3B forms a complementary relationship with that in FIG. 3A.

Figure 4:
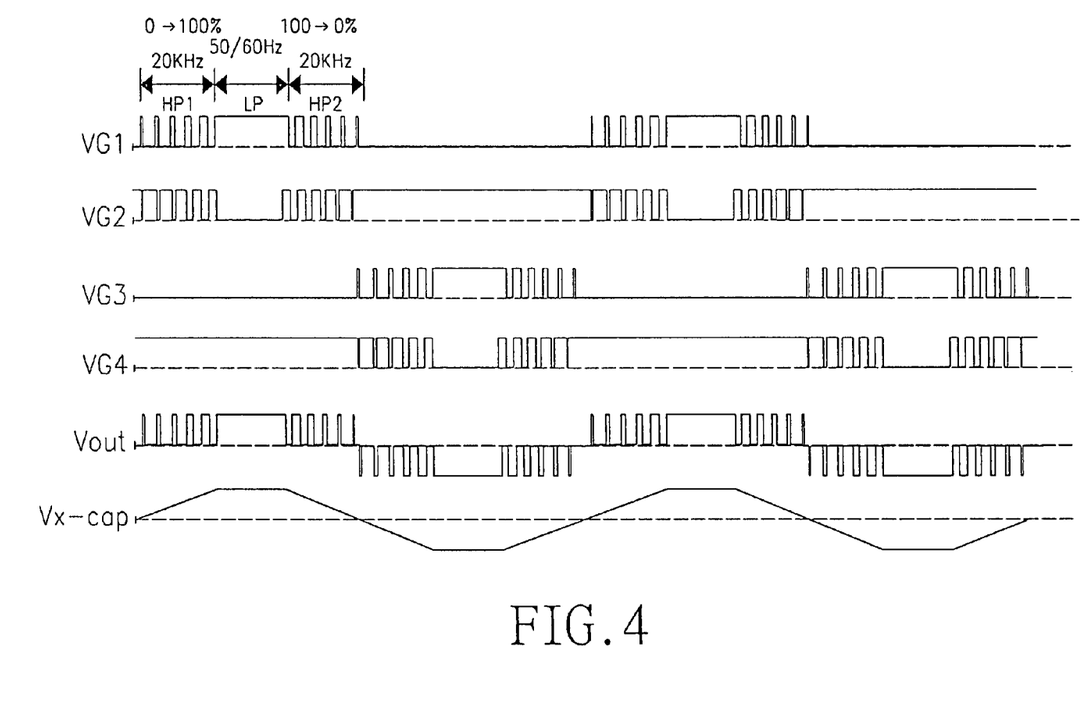
FIG. 4 is a first operating curve diagram illustrating the relationship between dynamic PWM signals and a waveform of output voltage in accordance with the present invention.

With reference to FIG. 4, four sets of dynamic PWM signals VG1, VG2, VG3 and VG4 outputted by the dynamic PWM control module serve to control the on and off of the four active switches G1, G2, G3 and G4 in the switch circuit (20). Each duty cycle of the dynamic PWM signal VG1 for controlling the active switch G1 has a first high-frequency zone (HP1), a low-frequency zone (LP) and a second high-frequency zone (HP2). The widths of the plurality of square waves in the first high-frequency zone (HP1) increase progressively while the widths of the plurality of square waves in the second high-frequency zone (HP2) decrease progressively. The plurality of square waves in the dynamic PWM signal VG3 and the dynamic PWM signal VG1 alternately appear in each duty cycle. The waveform of the plurality of square waves in the dynamic PWM signal VG3 for controlling the active switch G3 is the same as that in the dynamic PWM signal VG1 for controlling the active switch G1.

Each duty cycle of the dynamic PWM signal VG2 for controlling the active switch G2 has a first high-frequency zone (HP1), a low-frequency zone (LP) and a second high-frequency zone (HP2). The widths of the plurality of square waves in the first high-frequency zone (HP1) decrease progressively while the widths of the plurality of square waves in the second high-frequency zone (HP2) increase progressively. The low-frequency zone has a zero voltage. The pulse distribution of the dynamic PWM signal VG2 forms a complementary relationship with that of the dynamic PWM signal VG1. The plurality of square waves in the dynamic PWM signal VG4 and the dynamic PWM signal VG2 alternately appear in each duty cycle. The waveform of the plurality of square waves in the dynamic PWM signal VG4 for controlling the active switch G4 is the same as that in the dynamic PWM signal VG2 for controlling the active switch G2.

When the dynamic PWM control module (40) employs the PWM signals VG1, VG2, VG3 and VG4 to respectively control the on an off of the active switches G1, G2, G3 and G4, the voltage waveform (Vout) induced from the secondary side of the transformer (30) is shown as in FIG. 4. Because of the existence of the leakage inductance $L_K$ in the transformer, a filtering function is generated in collaboration with the output capacitor (31). Therefore, the voltage waveform Vx-cap generated at the output capacitor (31) (the power output terminal) is a trapezoidal continuous wave. Given an output like this, the UPS can be almost maintained in a continuously outputting state to support an active load and satisfy the hold-up time demand.

Figure 5:
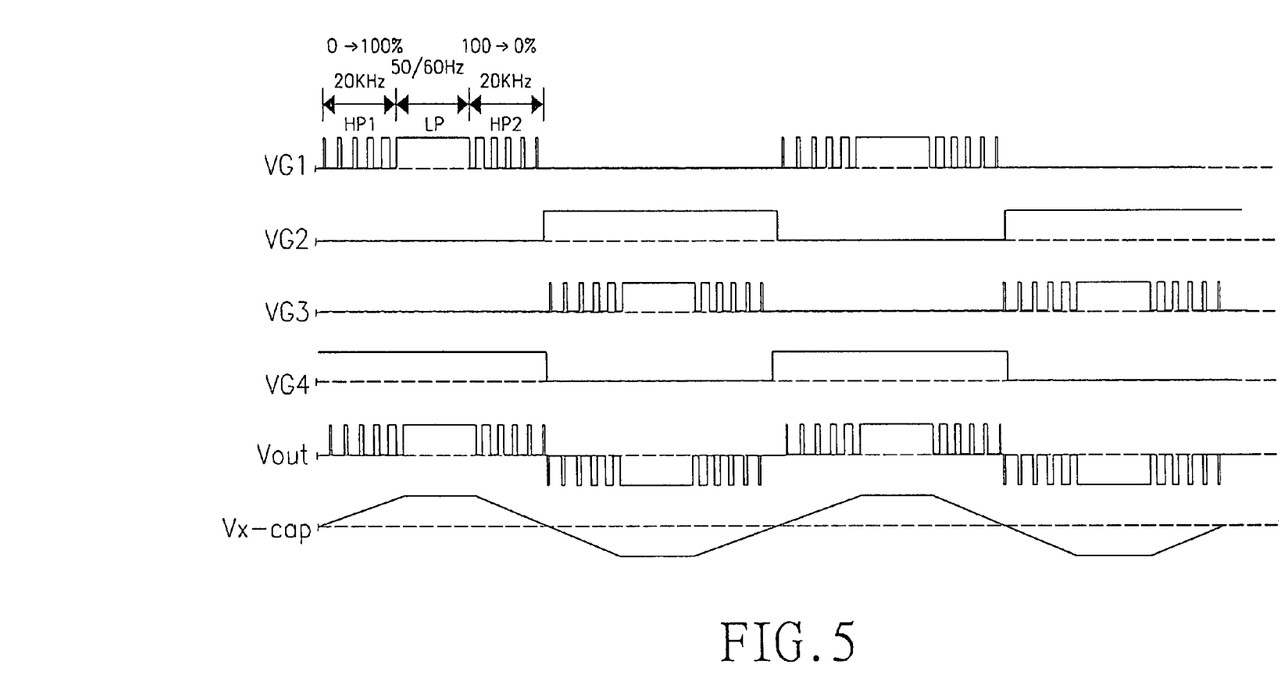
FIG. 5 is a second operating curve diagram illustrating the relationship between dynamic PWM signals and a waveform of output voltage in accordance with the present invention.
Figure 6:
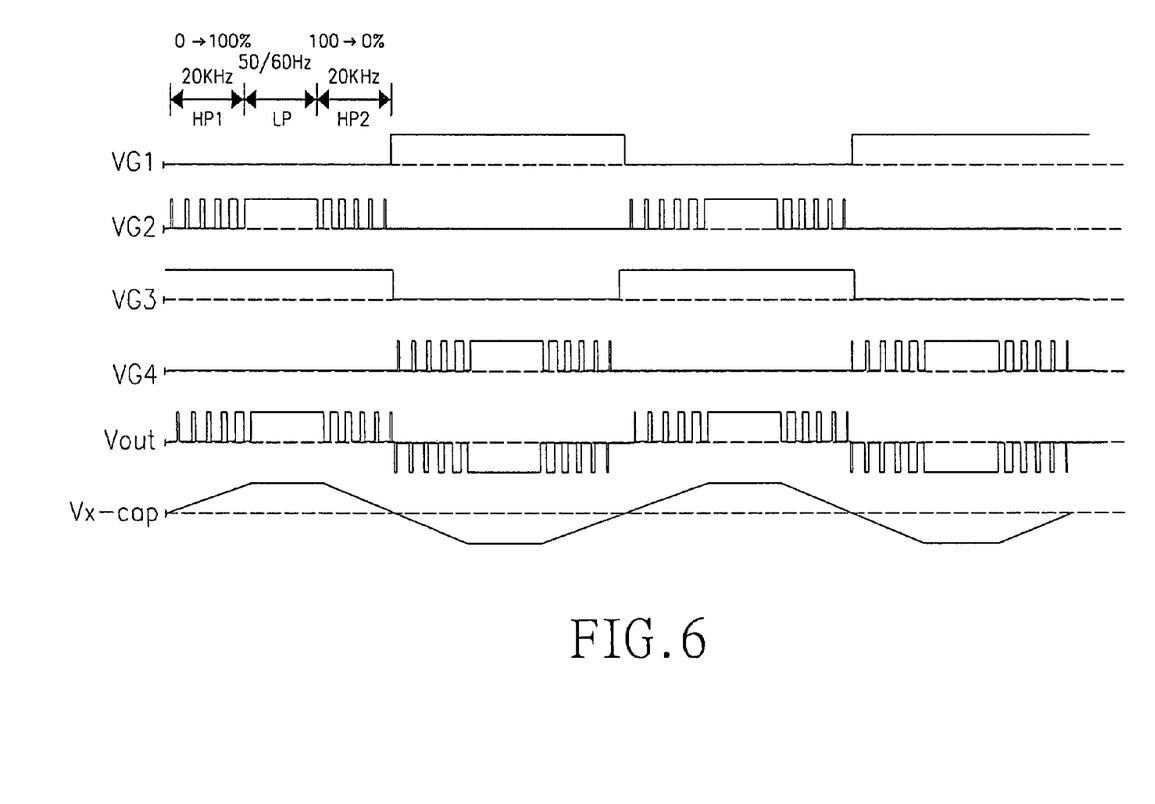
FIG. 6 is a third operating curve diagram illustrating the relationship between dynamic PWM signals and a waveform of output voltage in accordance with the present invention.
Figure 7:
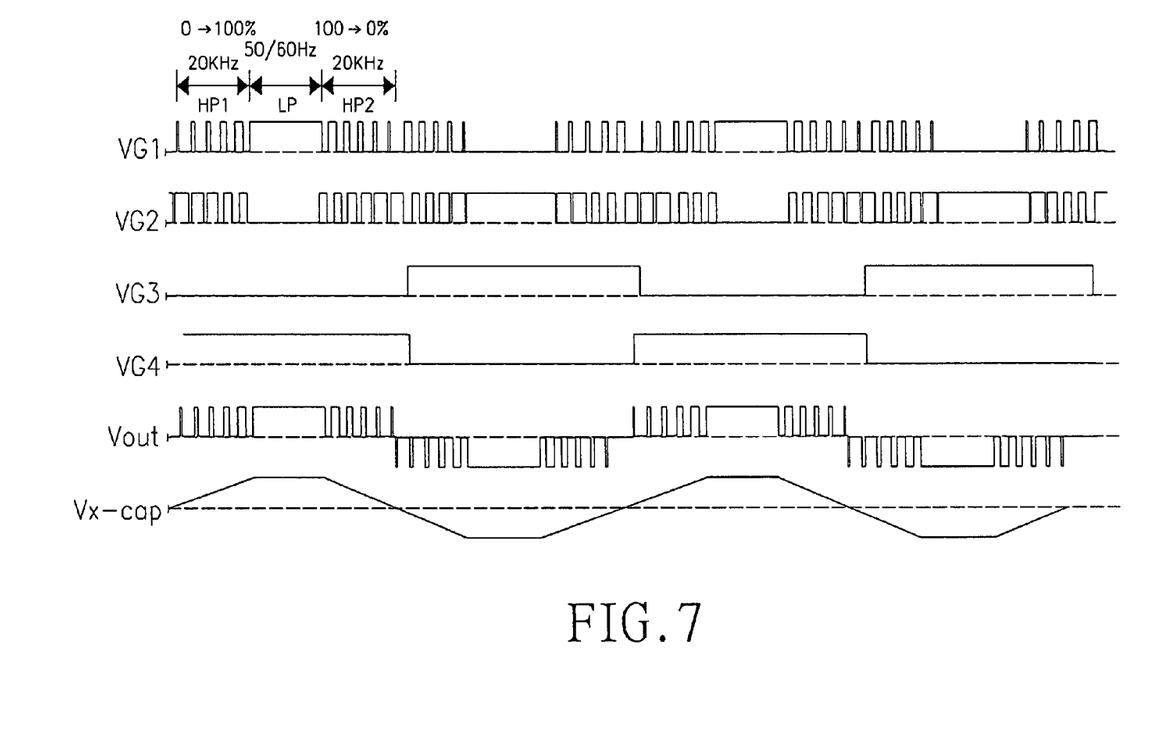
FIG. 7 is a fourth operating curve diagram illustrating the relationship between dynamic PWM signals and a waveform of output voltage in accordance with the present invention.

In addition to the waveforms of the dynamic PWM signals, VG1, VG2, VG3 and VG4, different waveforms thereof are shown in FIGS. 5-7.

In sum, the dynamic PWM control module adopted in the UPS of the present invention can alternately generate various sets of dynamic PWM signals. Each duty cycle in the dynamic PWM signals contains a plurality of low-frequency square waves and high-frequency square waves. Given the filtering effect provided by the leakage inductance in the transformer and the output capacitor, a trapezoidal continuous wave can be generated at the power output terminal. The quasi-continuous output can satisfy the hold-up time demand and further support an active load to adopt the UPS.

Most of the pulses in a duty cycle of the dynamic PWM signals pertain to square wave. In other words, the active switches in the UPS perform low-frequency switching most of the time, thereby greatly reducing the switching loss of the active switches (MOSFET).

Furthermore, based on the foregoing circuit structure, the transformer therein can adopt a low-frequency transformer with minor modification. As a result, the development cost of the present invention can be effectively lowered.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. An uninterruptible power supply supporting active loads, comprising:
   a charge and discharge module having a battery set and a charger charging the battery set with an input power;
   a switch circuit having at least two active switches connected to the battery set;
   a dynamic PWM control module connected with each of the active switches of the switch circuit, alternately outputting duty cycles, wherein each duty cycle has a plurality of low-frequency square waves and hi frequency square waves in a first high-frequency zone, a low-frequency zone, and a second high-frequency zone, widths of the square waves in the first high-frequency zone increase progressively, and widths of the square waves in the second high-frequency zone decrease progressively, and alternately controlling each of the active switches to turn on or off; and
   a transformer having a primary side connected with the switch circuit and a secondary side whose two terminals are connected with an output capacitor generating a filtering function in collaboration with a leakage inductance in the secondary side of the transformer.

2. The uninterruptible power supply supporting active loads as claimed in claim 1, wherein frequencies of the square waves in the first and second high-frequency zones are 20 kHz, and frequencies of the square waves in the low-frequency zone are one of 50 Hz and 60 Hz.

3. The uninterruptible power supply supporting active loads as claimed in claim 1, wherein an input terminal of the charger in the charge and discharge module is connected with an AC power source through a rectifier.

4. The uninterruptible power supply supporting active loads as claimed in claim 1, wherein an input terminal of the charger in the charge and discharge module is connected with a winding of the secondary side through a rectifier.

5. An uninterruptible power supply supporting active loads, comprising:
   a charge and discharge module having a battery set and a charger charging the battery set with an input power;
   a switch circuit having at least two active switches connected to the battery set;
   a dynamic PWM control module connected with each of the active switches of the switch circuit, alternately outputting duty cycles, wherein each duty cycle has a plurality of low-frequency square waves and high-frequency square waves distributed in a first high-frequency zone, a low-frequency zone, and a second high-frequency zone, widths of the square waves in the first high-frequency zone decrease progressively, and widths of the square waves in the second high-frequency zone increase progressively, and alternately controlling each of the active switches to turn on or off; and
   a transformer having a primary side connected with the switch circuit and a secondary side whose two terminals are connected with an output capacitor generating a filtering function in collaboration with a leakage inductance in the secondary side of the transformer.

6. The uninterruptible power supply supporting active loads as claimed in claim 5, wherein frequencies of the square waves in the first and the second high-frequency zones are 20 kHz, and frequencies of the square waves in the low-frequency zone are one of 50 Hz and 60 Hz.

7. The uninterruptible power supply supporting active loads as claimed in claim 5, wherein an input terminal of the charger in the charge and discharge module is connected with an AC power source through a rectifier.

8. The uninterruptible power supply supporting active loads as claimed in claim 5, wherein an input terminal of the charger in the charge and discharge module is connected with a winding of the secondary side through a rectifier.

* * * * *